US009475377B2

(12) United States Patent
Ellis (10) Patent No.: US 9,475,377 B2
(45) Date of Patent: Oct. 25, 2016

(54) HYBRID ELECTRIC ROTARY ENGINE

(71) Applicant: William A. Ellis, Braselton, GA (US)

(72) Inventor: William A. Ellis, Braselton, GA (US)

(*) Notice: Subject to any disclaimer, the term of this patent is extended or adjusted under 35 U.S.C. 154(b) by 489 days.

(21) Appl. No.: 13/931,254

(22) Filed: Jun. 28, 2013

(65) Prior Publication Data

US 2015/0000245 A1    Jan. 1, 2015

(51) Int. Cl.

| | |
|---|---|
| *F02B 53/00* | (2006.01) |
| *F02B 53/04* | (2006.01) |
| *B60K 6/24* | (2007.10) |
| *F02B 53/02* | (2006.01) |
| *F02B 53/06* | (2006.01) |
| *F01C 1/32* | (2006.01) |
| *F01C 9/00* | (2006.01) |
| *F01C 1/44* | (2006.01) |
| *F01C 1/06* | (2006.01) |

(52) U.S. Cl.
CPC . *B60K 6/24* (2013.01); *F01C 1/06* (2013.01); *F01C 1/321* (2013.01); *F01C 1/44* (2013.01); *F01C 9/002* (2013.01); *F02B 53/00* (2013.01); *F02B 53/02* (2013.01); *F02B 53/06* (2013.01); *F04C 2240/45* (2013.01); *Y02T 10/6295* (2013.01)

(58) Field of Classification Search
CPC .......... B60K 6/24; F02B 53/00; F02B 53/02; F02B 53/04; F01C 1/06; F01C 1/321; F01C 9/002; F01C 1/44; F04C 2240/45
USPC .......... 60/39.44, 39.34, 39.35; 123/218, 241, 123/243; 91/176
See application file for complete search history.

(56) References Cited

U.S. PATENT DOCUMENTS

| | | | | |
|---|---|---|---|---|
| 2,511,441 | A | * | 6/1950 | Loubiere ............... F01C 1/3442 123/235 |
| 3,103,919 | A | * | 9/1963 | Drapeau, Jr. ........... F02B 53/00 123/231 |
| 3,145,533 | A | * | 8/1964 | Ollinger .................. F02B 53/00 60/39.34 |
| 3,367,240 | A | * | 2/1968 | Keppler ................ F01B 3/0094 91/176 |
| 3,804,549 | A | * | 4/1974 | Kellenbarger ............ F02C 5/04 60/39.34 |
| 3,923,013 | A | | 12/1975 | Myers |
| 3,934,559 | A | | 1/1976 | Cohen |
| 3,942,484 | A | | 3/1976 | Pile |
| 4,031,420 | A | * | 6/1977 | Carini .................... H02K 7/025 310/112 |
| 4,389,173 | A | * | 6/1983 | Kite ......................... F01C 1/44 123/206 |
| 4,539,941 | A | * | 9/1985 | Wang ..................... F01C 9/002 123/18 R |
| 5,125,379 | A | | 6/1992 | Linville |
| 5,404,850 | A | | 4/1995 | La Bell, Jr. |
| 5,636,509 | A | * | 6/1997 | Abell ..................... F02C 3/165 60/39.35 |

(Continued)

Primary Examiner — Thai Ba Trieu
(74) Attorney, Agent, or Firm — Jeffrey C. Watson; Grell & Watson Patent Attorneys (57) ABSTRACT

A hybrid electric rotary engine is provided having a pair of rotors separated by a divider and configured for rotation in opposite directions, a timing gear engaged between the inner faces of the rotors, and at least one pair of slanted rotor openings in the rim of each rotor for alignment with at least one pair of slanted divider openings to form a pair of combustion chambers in communication with at least one pair of exhaust chambers for venting of exhaust and to provide rotational thrust.

20 Claims, 6 Drawing Sheets

(56) References Cited

U.S. PATENT DOCUMENTS

| | | | |
|---|---|---|---|
| 6,032,636 A | 3/2000 | Kajino | |
| 6,698,395 B1 | 3/2004 | Vasilantone | |
| 6,968,826 B2* | 11/2005 | Doering | F02D 41/1401 123/319 |
| 7,849,822 B2* | 12/2010 | Yim | F02B 53/02 123/241 |
| 8,225,767 B2* | 7/2012 | Tinney | F01C 1/321 123/212 |
| 8,333,060 B2* | 12/2012 | Witteveen | F02C 3/16 60/39.34 |
| 8,516,990 B1* | 8/2013 | Vasilantone | B60K 6/24 123/243 |
| 8,978,619 B1* | 3/2015 | Purvis | F02B 53/04 123/218 |
| 2009/0199812 A1 | 8/2009 | Chou | |

* cited by examiner

HYBRID ELECTRIC ROTARY ENGINE

BACKGROUND

This invention pertains to internal combustion engines and to rotary type engines. More particularly, this invention pertains to a hybrid electric rotary engine having a pair of rotors configured for rotation in opposite directions and combustion chambers to provide rotational thrust.

SUMMARY

According to one embodiment of the present invention, a hybrid electric rotary engine is provided that includes (1) a pair of rotors separated by a divider and including an inner face adjacent to the divider, an outer face, an axle hole, and a rim adjoining the outer face to the inner face at the outer edge, each rotor configured for rotation around an axle opposite to one another, (2) a timing gear engaged between the inner face of the first rotor and the inner face of the second rotor, (3) at least one pair of slanted rotor openings in the rim of each rotor and opposite each other, each pair of slanted rotor openings corresponding to at least one pair of slanted divider openings within the divider, each slanted rotor opening configured to align with at least one slanted divider opening per rotor revolution, so that the alignment of a pair of slanted rotor openings with a pair of slanted divider openings forms a combustion chamber, (4) at least one pair of exhaust chambers within each rotor and in communication with one of the slanted rotor openings, each exhaust chamber extending from the corresponding slanted rotor opening substantially toward the axle and providing for venting of exhaust through an inset in the outer face of the respective rotor to provide additional thrust, whereby fuel is injected into each combustion chamber during alignment, and the injected fuel is ignited to provide rotational thrust to each rotor.

In one embodiment, the pair of rotors are substantially identical in diameter and weight.

In another embodiment, each slanted rotor opening of each at least one pair of slanted rotor openings is situated opposite the other in the rim of the respective rotor, to form a cavity extending from the rim toward the axle hole, and also including an opening on the inner face and extending at an angle from the inner face toward the outer face of the respective rotor and substantially in the direction of rotation.

In another embodiment, each rotor further includes a crown type gear on the inner face of the respective rotor and the pinion gear engages the crown type gear of each rotor.

In another embodiment, the the timing gear is further configured for driving at least one of an oil pump, a water pump, and/or a supercharger.

In another embodiment, at least one pair of slanted rotor openings aligns with at least one pair of slanted divider openings per rotor revolution.

In another embodiment, each exhaust chamber includes a plurality of rocket nozzles, the plurality of rocket nozzles in communication with the corresponding inset for venting exhaust.

In another embodiment, each rotor includes a plurality of magnets in the outer face, the magnets located for communication with a plurality of coils adjacent each rotor.

In another embodiment, the hybrid electric rotary engine includes a casing in which the pair of rotors and the divider are enclosed, and which includes an opening dimensioned for the timing gear, a plurality of air bearing injection holes on each side of the casing and situated near the rim of each rotor, and a plurality of coils on each side of the casing and situated around the periphery of the casing and located to communicate with the rotor magnets.

According to another embodiment of the present invention, a hybrid electric rotary engine is provided that includes (1) a pair of rotors separated by a divider and comprising an inner face adjacent to the divider, an outer face, an axle hole, and a rim, the rim adjoining the outer face to the inner face at an outer edge, each rotor configured for a direction of rotation around an axle and opposite to one another, (2) a timing gear engaged between the inner face of the first rotor and the inner face of the second rotor, (3) at least one pair of rotor openings in the rim of each rotor and opposite each other, each rotor opening situated opposite each other in the rim of the respective rotor, each rotor opening comprising a cavity extending from the rim toward the axle hole, and also including an opening on the inner face and extending from the inner face toward the outer face of the respective rotor, (4) at least one pair of divider openings within the divider, each divider opening located for alignment with at least one rotor opening per rotor revolution, the alignment of at least one pair of divider openings with at least one pair of rotor openings forming a combustion chamber, and (5) at least one pair of exhaust chambers within each rotor, each exhaust chamber in communication with one of the rotor openings, each exhaust chamber extending from the corresponding rotor opening substantially toward the axle and providing for venting of exhaust through the outer face of the respective rotor to provide additional thrust, whereby fuel is injected into each combustion chamber during alignment, and whereby the injected fuel is ignited to provide rotational thrust to each rotor.

In another embodiment, each rotor opening of each at least one pair of rotor openings is a slanted rotor opening extending from the inner face toward the outer face of the respective rotor and substantially in the direction of rotation.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

The above-mentioned features will become more clearly understood from the following detailed description read together with the drawings in which:

FIG. 8-A, FIG. 8-B and FIG. 8-C together form an illustration of the rotation of the rotors in a hybrid electric rotary engine;

DETAILED DESCRIPTION

A hybrid electric rotary engine having a pair of rotors separated by a divider and configured for rotation in opposite directions, a timing gear engaged between the inner faces of the rotors, and at least one pair of slanted rotor openings in the rim of each rotor for alignment with at least one pair of slanted divider openings to form a pair of combustion chambers in communication with at least one pair of exhaust chambers for venting of exhaust and to provide rotational thrust is disclosed.

According to one embodiment, a hybrid electric rotary engine is provided that includes only three major moving parts, a pair of rotors and a timing gear, each performing multiple functions. The engine combines multiple principles simultaneously to induce rotation. Some of these features include shared combustion chambers formed by rotor openings in communication with exhaust chambers, rocket nozzle exhaust ports, and the user of air bearing air flow to induce rotation by laminar flow boundary adhesion over the rotor disk surface.

The engine includes (1) a pair of rotors separated by a divider and including an inner face adjacent to the divider, an outer face, an axle hole, and a rim adjoining the outer face to the inner face at the outer edge, each rotor configured for rotation around an axle opposite to one another, (2) a timing gear engaged between the inner face of the first rotor and the inner face of the second rotor, (3) at least one pair of slanted rotor openings in the rim of each rotor and opposite each other, each pair of slanted rotor openings corresponding to at least one pair of slanted divider openings within the divider, each slanted rotor opening configured to align with at least one slanted divider opening per rotor revolution, so that the alignment of a pair of slanted rotor openings with a pair of slanted divider openings forms a combustion chamber, (4) at least one pair of exhaust chambers within each rotor and in communication with one of the slanted rotor openings, each exhaust chamber extending from the corresponding slanted rotor opening substantially toward the axle and providing for venting of exhaust through an inset in the outer face of the respective rotor to provide additional thrust, whereby fuel is injected into each combustion chamber during alignment, and the injected fuel is ignited to provide rotational thrust to each rotor.

Figure 1:
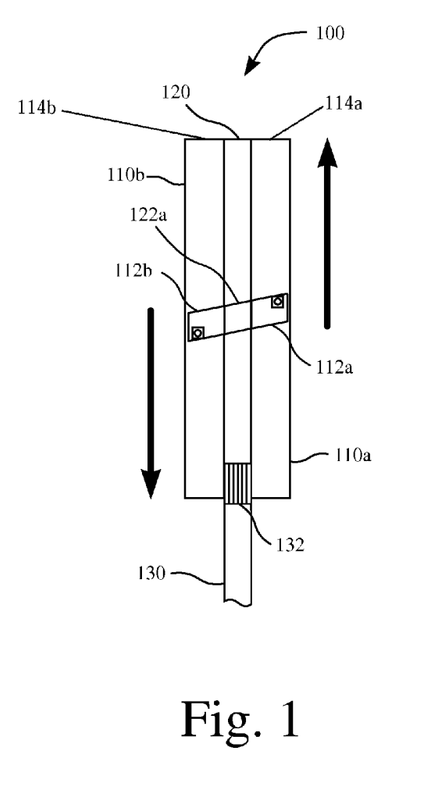
FIG. 1 is an illustration of an edge view of a hybrid electric rotary engine.

FIG. 1 is an illustration of an edge view of a hybrid electric rotary engine 100. The engine 100 includes a pair of rotors 110a, 110b (collectively 110) separated by a divider 120. In one embodiment, each rotor 110a, 110b includes a pair of rotor openings 112a, 112b. In the illustrated embodiment, a rotor opening 112a is shown on the near edge of the rotor 110a, and the corresponding rotor opening 112b cannot be seen in this view. Similarly, a rotor opening 112b is shown on the near edge of rotor 110b while the corresponding rotor opening 112a cannot be seen. That is, each rotor 110a, 110b also includes corresponding rotor openings 112b, 112a opposite the rotor openings 112a, 112b that are shown. In the illustrated embodiment shown in FIG. 1, the rotors 110a, 110b are substantially identical in diameter, weight and configuration.

The divider 120 includes a pair of divider openings 122a, 122b (collectively 122) located opposite each other on opposing edges of the divider 120. In the illustrated embodiment, a divider opening 122a is shown on the near edge of the divider 120 and the opposing divider opening 122b cannot be seen in this view. The rotor openings 112a, 112b and the divider openings 122 are located so that a rotor opening 112a, 112b from each rotor 110a, 110b simultaneously lines up with each divider opening 122 during each revolution of the rotors 110. The rotors 110, the rotor openings 112, and the divider openings 122 are discussed in further detail below.

A drive shaft 130 includes a pinion gear 132 between the rotors 110a, 110b that engages the inner face of each rotor 110a, 110b. The rotors 110a, 110b are synchronized by the pinion gear 132 as they rotate in opposite directions around an axle (as illustrated by the arrows adjacent each rotor 110a, 110b). The pinion gear 132 provides timing for the engine by timing the rotation of the rotors 110a, 110b to keep them in synch with each other.

In the illustrated embodiment, the rotor openings 112 are slanted generally in the direction of rotation for each rotor 110. As shown in FIG. 1, the near rotor opening 112a corresponds to the rotor 110a so that the near rotor opening 112a is rotating upward as shown by the arrow adjacent to the rotor 110a. Similarly, the near rotor opening 112b corresponds to the rotor 110b so that the near rotor opening 112b is rotating downward as shown by the arrow adjacent to the rotor 110b. Of course, the rotor openings opposite the near rotor openings 112a, 112b are rotating in opposite directions.

Figure 2:
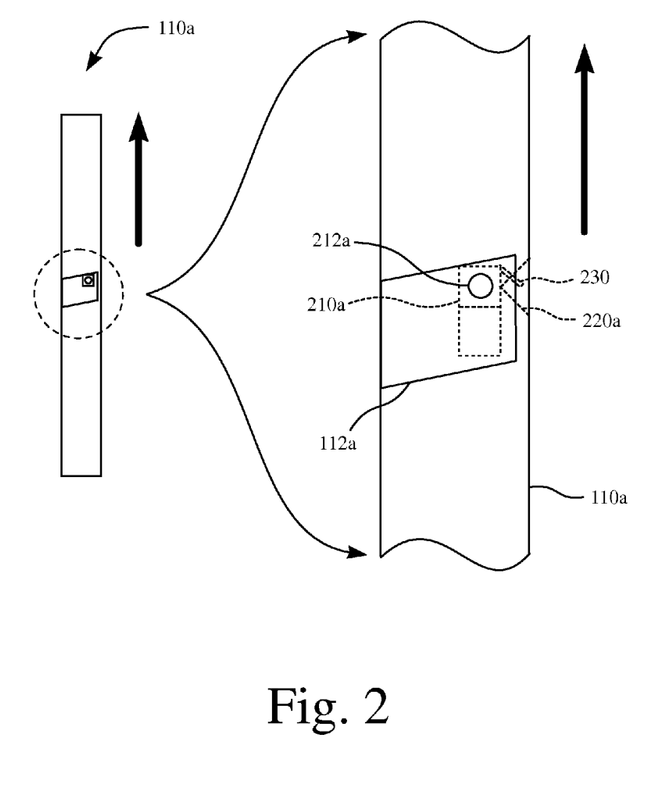
FIG. 2 is an edge view of a rotor in a hybrid electric rotary engine together with a zoom view of an opening in the rotor.

FIG. 2 is an edge view of one rotor 110a in a hybrid electric rotary engine 100 together with a zoom view of a rotor opening 112a in the rotor 110a. The rotor 110a includes a corresponding rotor opening 112b opposite the rotor opening 112a. Similarly, the corresponding rotor 110b also includes a pair of rotor openings 112a, 112b. It should be noted that a rotor 110 can include any number of rotor openings 112 situated around the outer edge of the rotor. In various embodiments, each rotor 110 will include at least one pair of rotor openings 112. For balance and synchronicity of the engine 100, the corresponding rotors 110 will each include the same number of rotor openings 112, typically in pairs, and typically located opposite each other on the edges of the respective rotor 110.

The rotor opening 112a provides connection to an exhaust chamber 210a through an inlet 212a. In one embodiment, the rotor opening 112a is slanted generally in the direction of rotation of the rotor 110a. The rotor opening 112a is completely open on the inner face of the rotor 110a; the rotor opening 112a is open to the divider 120 so that when the rotor opening 112a lines up with a divider opening 122a during rotation, a combustion chamber is formed. A corresponding rotor opening 112 of the corresponding rotor 110b simultaneously lines up with the divider opening 122a at its other end so that the combustion chamber extends between both rotor openings 112 and the divider opening 122 between them.

Fuel is typically injected into the combustion chamber when the rotor openings 112 and the divider opening 122 align. The combustion chamber is in communication with each respective exhaust chamber 210 of the respective rotors 110 through respective inlets 212.

The exhaust chamber 210a extends from the inlet 212a of the rotor opening 112a generally toward the center of the rotor 110a. Upon ignition, exhaust is expelled from the exhaust chamber 210a through multiple rocket nozzles 230 that extend from the exhaust chamber 210a to an inset 220a that extends along the outer face of the rotor 110a. Of course, each rotor opening 112 is connected via respective inlets 212 to separate exhaust chambers 210 of the respective rotor 110. And each exhaust chamber 210 is connected via respective rocket nozzles 230 to a respective inset along the face of the respective rotor 110.

In one embodiment of the engine 100, two rotor openings 112 are situated opposite each other for each of a pair of rotors 110. Each rotor opening corresponds to an exhaust chamber 210 that extends toward the center of the rotor 110, and a corresponding inset extends along the outer face of the rotor 110 for each exhaust chamber 210. One such embodiment might include one pair of divider openings 122 so that the two pair of rotor openings 112 each align with two separate divider openings 122 to form a combustion chamber twice during each revolution of the rotors 110. With the rotor openings 112 situated opposite each other on the rotor 110, the two combustion chambers are formed simultaneously twice during each revolution of the rotors 110.

In another embodiment of the engine 100, two pair of rotor openings 112 are situated, with each pair opposite the corresponding rotor opening 112 of that respective pair, such that the rotor openings are spaced substantially one-fourth of the distance around the circumference of the rotor apart from other rotor openings. One such embodiment could include two pair of divider openings 122 similarly spaced so that four combustion chambers are formed simultaneously when the rotor openings 112 align with the respective divider openings 122. In such an embodiment, each pair of rotor openings 112 would align with a divider opening 122 four times per revolution of the rotors 110.

Figure 3:
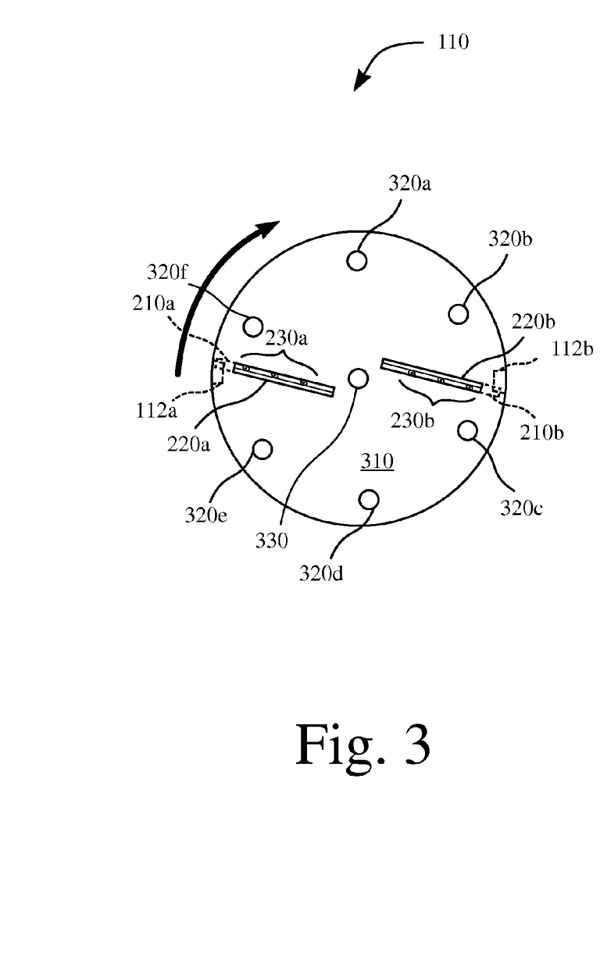
FIG. 3 is a side view of an outer face of a rotor in a hybrid electric rotary engine.
Figure 4:
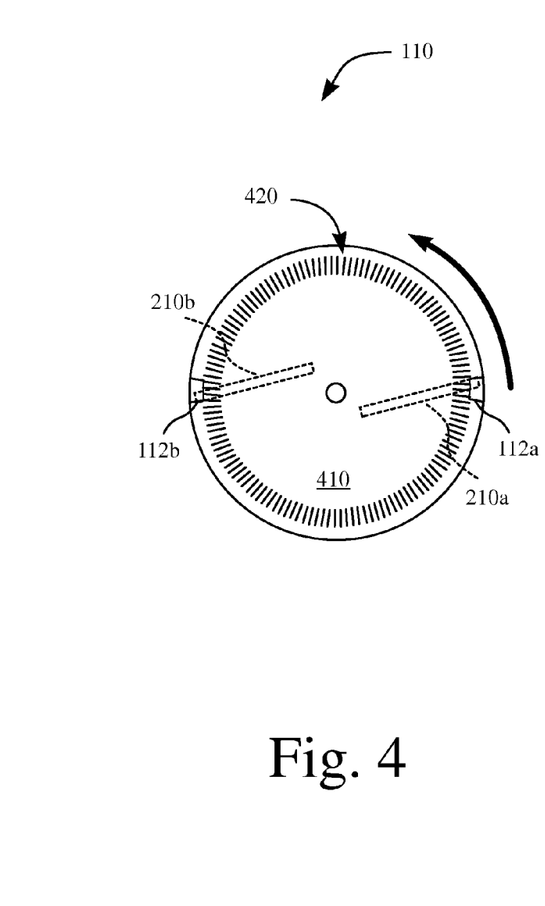
FIG. 4 is a side view of an inner face of a rotor in a hybrid electric rotary engine.

FIG. 3 is a side view of an outer face 310 of an exemplary rotor 110*a* in a hybrid electric rotary engine 100. FIG. 4 is a side view of an inner face 410 of an exemplary rotor 110*a* in a hybrid electric rotary engine 100. A rotor 110 includes an outer face 310 and an inner face 410. In the illustrated embodiment, the rotor 110*a* includes a pair of insets 220*a*, 220*b* corresponding to a pair of exhaust chambers 210*a*, 210*b*. The outer face 310 also includes a number of magnets 320*a*, 320*b*, 320*c*, 320*d*, 320*e*, 320*f* (collectively 320) spaced generally symmetrically around the outer face 310 and in from the outer edge. The magnets 320 are inset into the rotor 110 and are flush with the outer face 310. The actual number of magnets 320 will vary for different embodiments and is dependent only upon the desired results with the corresponding coils in the casing adjacent the outer face 310 and discussed in more detail below.

In the illustrated embodiment, the rotor 110*a* includes a pair of exhaust chambers 210*a*, 210*b* (FIG. 4) that extend generally toward the center of the rotor 110*a*. The insets 220*a*, 220*b* that correspond to the respective exhaust chambers are shown in FIG. 3, and are aligned generally over the exhaust chambers 210*a*, 210*b* as viewed from the outer face 310 of the rotor 110*a*. Of course, the actual number of exhaust chambers 210 with the corresponding insets 220 can vary according to specific technical requirements and desired performance level of the engine 100.

As can be seen in FIG. 3 and in the previous FIG. 2, the insets 220*a*, 220*b* are cut into the outer face 310 of the respective rotor 110 and extend for some length toward the axle opening 330. In one embodiment, each inset 220 includes a beveled 45° facet cut in the opposite direction to the rotation of the rotor 110. This cut provides for the rocket nozzles 230*a*, 230*b* to provide the exhaust away from the rotation of the respective rotor 110 and provides rotational thrust that propels the rotor 110 in the direction of rotation.

As is evident in FIG. 4, the rotor openings 112*a*, 112*b* are open to and visible from the inner face 410 of the rotor 110. At the inner face 410, each rotor opening 112*a*, 112*b* aligns with the divider openings 122*a*, 122*b* as each rotor 110 revolves around the axle. Of course, the rotor openings 112*a*, 112*b* cannot be seen from the outer face 310 as is evident in FIG. 3.

Each inset 220*a*, 220*b* into the outer face 310 includes rocket nozzles 230*a*, 230*b* that provide for the exhaust to exit the combustion chamber and the exhaust chambers 210*a*, 210*b* after ignition. In the illustrated embodiment shown in FIG. 3, there are three rocket nozzles 230*a*, 230*b* for each inset 220*a*, 220*b*. Of course, the actual number of rocket nozzles 230 for a particular embodiment can vary according to the fuel used and also with the desired thrust to be provided upon ignition. The actual number of rocket nozzles 230 used will vary with the particular embodiment and can be more or less than is shown in the illustration of FIG. 3.

A crown and pinion type gear arrangement provides timing for the rotors 110*a*, 110*b*. The drive shaft 130 includes a pinion gear 132 that protrudes into the outer portion of the divider 120 and engages a pair of crown type gears 420 on the inner face 410 of each rotor 110*a*, 110*b*. The teeth of each crown gear 420 protrude generally perpendicular from the inner face 410 of the respective rotor 110. It should be appreciated that there are numerous sizes and combinations of crown and pinion type gear combinations that are suitable for the arrangement between the pinion gear 132 and the crown type gears 420 of the respective inner faces 410. It is not intended that the pinion gear 132 and crown type gears 420 be limited to any particular combination so long as the pinion gear 132 provides timing to the rotors 110 as they revolve in opposite directions around the axle. As the rotors 110*a*, 110*b* revolve in opposite directions, the revolutions cause the pinion gear 132 between them to turn while also providing for keeping the rotors 110*a*, 110*b* in synch with each other. This timing maintains the periodic and consistent alignment between the rotor openings 112*a*, 112*b* of each rotor 110*a*, 110*b* with the divider openings 122*a*, 122*b* during rotation.

As shown in the illustrated embodiments of FIG. 3 and FIG. 4, the exhaust chambers 220*a*, 220*b* of the rotors 110 extend from each rotor opening 112*a*, 112*b* and generally toward the axle opening 330 of the rotor 110. In one embodiment, the exhaust chambers 220*a*, 220*b* and the corresponding insets 220*a*, 230*a*, are angled slightly away from the axle opening 330 and provide thrust upon ignition of the fuel. The angle is optimized for a particular rotor to provide for an optimal thrust upon fuel ignition.

Figure 5:
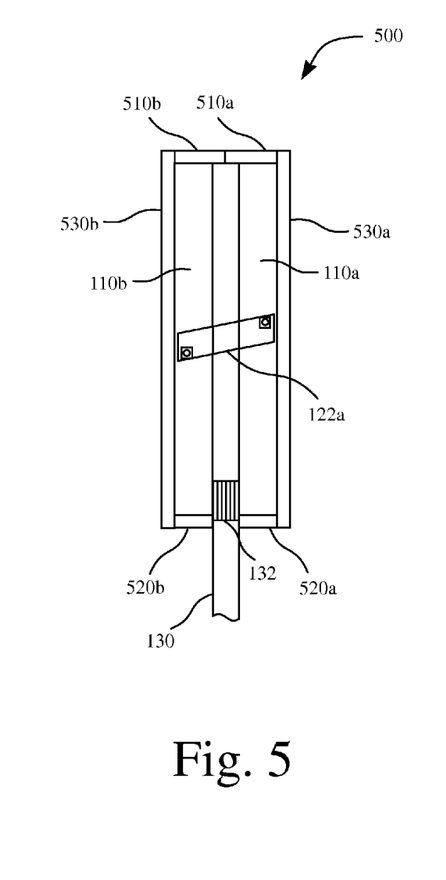
FIG. 5 is an illustration of a hybrid electric rotary engine within a casing.

FIG. 5 is an illustration of a hybrid electric rotary engine 100 within a casing 500. The engine 100 is enclosed within an exemplary casing 500. The casing 500 includes an upper casing 510*a*, 510*b* above the rotors, a lower casing 520*a* below the rotors, 520*b* and wall casings 530*a*, 530*b* on either side of the engine 100 with the engine in an upright position as shown in FIG. 5. In the illustrated embodiment, there is an upper casing 510*a* above and a lower casing 520*a* below the rotor 110*a*. A wall casing 530*a* is adjacent the outer face 310 of the rotor 110*a*. Similarly, there is an upper casing 510*b* above and a lower casing 520*b* below the rotor 110*b*. A wall casing 530*b* is adjacent the outer face 310 of the rotor 110*b*. The rotor openings 112*a*, 112*b* are shown in alignment with the divider opening 122*a*. Of course during operation, the rotors 110*a*, 110*b* are rotating in opposite directions to each other so that the rotor openings 112 will align with the divider openings 122 twice during each revolution for the illustrated embodiment.

Figure 6:
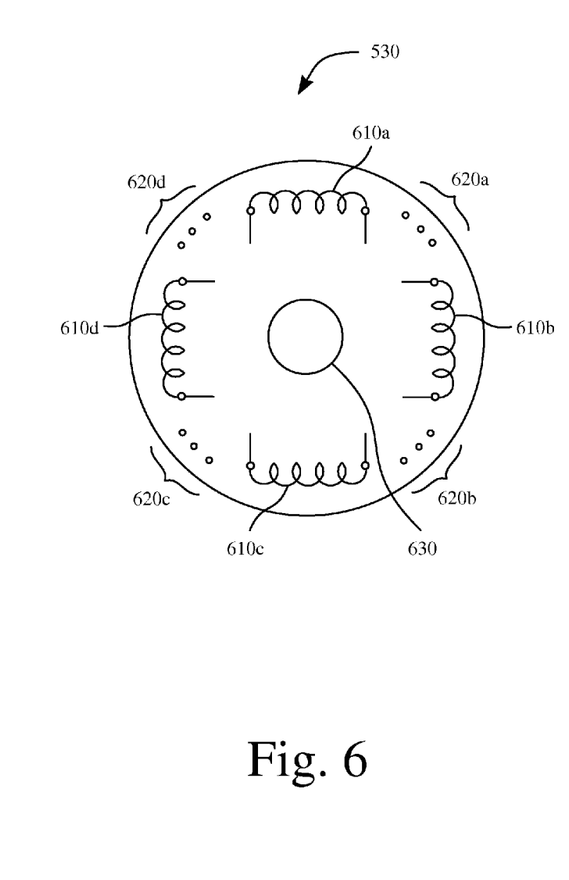
FIG. 6 is a view of an exemplary wall casing that fits adjacent to an outer face of a rotor for a hybrid electric rotary engine.

FIG. 6 is a view of an exemplary wall casing 530 that fits adjacent to an outer face 310 of a rotor 110 for a hybrid electric rotary engine 100. The exemplary wall casing 530 includes coils 610*a*, 610*b*, 610*c*, 610*d* around the inner portion adjacent to the rotor 110. In the exemplary embodiment, there are four coils 610 shown. It should be appreciated that any number of coils 610 could be present according to design considerations and the motor and/or generator design preferences of the engine 100.

In one embodiment, the hybrid electric rotary engine 100 includes electric motor/generator functionality that is provided by the interaction between the permanent magnets 320 in the rotors 110 and the coils 610*a*, 610*b*, 610*c*, 610*d* in the wall casings 530. When operating in fuel mode, the engine 100 acts as a generator to charge batteries for later use, as well as providing motive power through the driveshaft. In electric mode, the engine 100 uses the batteries as a conventional brushless electric motor. For maximum performance and/or efficiency, both the fuel mode and the electric power mode can be used simultaneously.

Each wall casing 530 also includes air bearing injection openings 620*a*, 620*b*, 620*c*, 620*d* located between the outer face 310 of the rotor and the inner edge of the casing wall 530. Air is provided by a supercharge (discussed below) and injected into the engine 100. The air injection bearings 620 are slanted in the direction of rotation corresponding to the rotor 100 adjacent the respective wall casing 530.

Each wall casing 530 also includes an exhaust opening 630 or port for venting the exhaust out of the engine 100. The exhaust may for example, be vented through a tube or other device for taking the exhaust away from the engine 100.

The bearing air flow is used to induce rotation by laminar flow boundary adhesion over the rotor disk surface. As the air/exhaust moves past each disk, the adhesive forces cause the molecules just above the metal surface of the rotor 110 to slow down and/or stick in place. The molecules just above those at the surface also slow down due to collisions and consequently slow down the flow above them. Farther away from the surface fewer collisions are affected by the rotor 110 surface.

Viscous forces cause the molecules that have become stuck to resist separation. These viscous forces generate a pulling force that is transmitted to the rotor 110, causing the rotor 110 to move in the direction of the air/exhaust gases.

This boundary layer effect is caused by the interaction of the molecules with the solid surface. As a result, the propelling air/exhaust follows a rapidly accelerated spiral path along the rotor faces until it reaches a suitable exit. Because the air/exhaust gases move in natural paths of least resistance, they experience gradual changes in velocity and direction. As a result more energy is delivered to the rotor and efficiency is improved.

The air bearing stream also provides cooling to the rotor 110, magnets 320, and coils 620. Additionally, the air bearing stream provides for exhausting gases from the combustion chamber and exhaust chambers, and induces rotation velocity, even when there is no fuel being detonated. Similar acceleration is also added by leakage of the exhaust gases that escape via a gap between the rotor 110 surface and the combustion chamber opening in the divider 120 (the divider opening 122) that would otherwise be wasted, thus mitigating a loss of efficiency due to such leakage.

Figure 7:
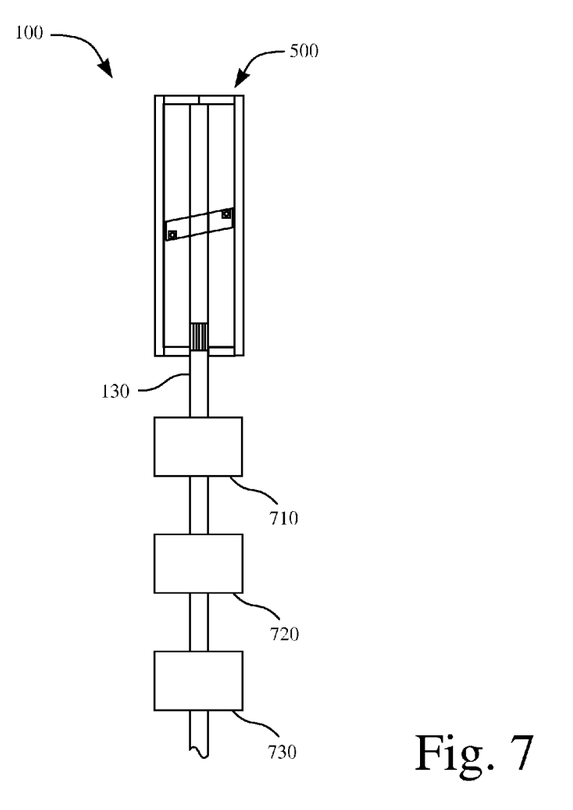
FIG. 7 is an illustration of a hybrid electric rotary engine with an oil pump, a water pump, and a supercharger.

FIG. 7 is an illustration of a hybrid electric rotary engine 100 with the additional components of an oil pump 710, a water pump 720, and a supercharger 730 included. For simplicity of operation, the illustration shows the oil pump 710, the water pump 720, and the supercharger 730 in concert with the drive shaft 130 and away from the lower portion of the casing 500. It should be noted that for efficiency of operation, each of the respective additional parts can be enclosed within the casing 500.

The drive shaft 130 is another multifunction part of the engine 100, consisting of a pinion gear 132 and two crown type gears 420 on the inner face 410 of the rotors 110. In one embodiment, the drive shaft 130 and the pinion gear 132 protrude into the outer dividing partition of the casing 500, where the oil pump 710 vanes and the supercharger 730 vanes are housed in their respective chambers.

The oil pump 710 provides for forcing the oil through a gallery in the divider (gallery not shown) to the axle bearings at the inner face 410 of the rotors 110. The function of the bearings is understood by those skilled in the art and is not shown in the drawings. Through centripetal force, the oil is spun during operation of the engine 100 to the outer edge of the casing 500 where it is collected and returned to the oil pump 710.

The water pump 720 provides coolant circulation through the divider 120 to remove heat from both the engine 100 and the oil.

As mentioned above, the supercharger provides compressed air to the air bearing injection openings 620 located around the periphery of the wall casings 530 to create an air bearing. The air bearing provides cooling to the rotors 110 before exiting via the exhaust opening 630 in each wall casing 530. In some embodiments, micro vanes are machined on the outer face 310 of each rotor 110 to provide additional rotational thrust from the air flow.

Figure 8:
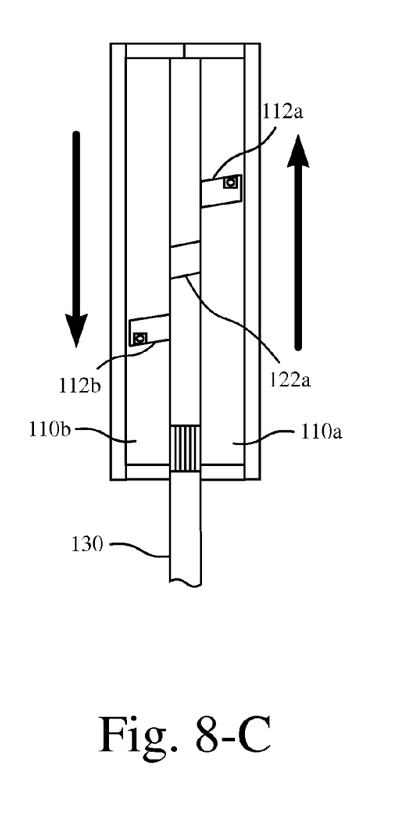

FIG. 8-A, FIG. 8-B and FIG. 8-C together form an illustration of the operation or rotation of the rotors 110 in a hybrid electric rotary engine 100. The rotation of the rotors 110*a*, 110*b* within the casing 500 of the hybrid electric rotary engine 100 are shown respectively by the arrows adjacent either side of the rotors 110*a*, 110*b*. The near edge of the rotor 110*a* is rotating upward while the near edge of the rotor 110*b* is rotating downward in each illustration.

As shown in FIG. 8-A, the rotor opening 112*b* is higher than the divider opening 122*a* at the moment illustrated. As the rotor 110*b* rotates the rotor opening 112*b* at the near edge of the rotor 110*b* moves downward. Similarly, the rotor opening 112*a* is lower than the divider opening 122*a* at the moment shown. As the rotor 110*a* rotates the rotor opening 112*a* at the near edge of the rotor 110*a* moves upward.

As is apparent from the illustration in FIG. 8-B, as both rotors 110*a*, 110*b* continue to rotate in opposite directions respectively around the axle, the rotor openings 112*a*, 112*b* align with the divider opening 122*a*. At the moment illustrated in FIG. 8-B, fuel is injected into the combustion chamber that is formed by the alignment of rotor opening 112*a*, divider opening 122*a*, and rotor opening 112*b*. Once the fuel is injected into the combustion chamber, it is then ignited.

The ignition of the fuel in the combustion chamber increases pressure which then extends beyond the combustion chamber, through each inlet 212*a*, 212*b* and into the exhaust chambers 210*a*, 210*b*. The increase in pressure of course, causes the exhaust gases to find the rocket nozzles 230*a*, 230*b* as the escape route. As the gases escape through the rocket nozzles 230*a*, 230*b*, the increased thrust propels the rotors 110*a*, 110*b* in the direction of rotation toward the next alignment of the rotor openings 112*a*, 112*b* with the divider openings 122*b* at the far edge of the engine 100.

The movement away from the alignment and toward the next alignment is shown in FIG. 8-C where the rotor opening 112*b* of rotor 110*b* is shown below the divider opening 122*a* and the rotor opening 112*a* of rotor 110*a* is shown above the divider opening 122*a*.

Figure 9:
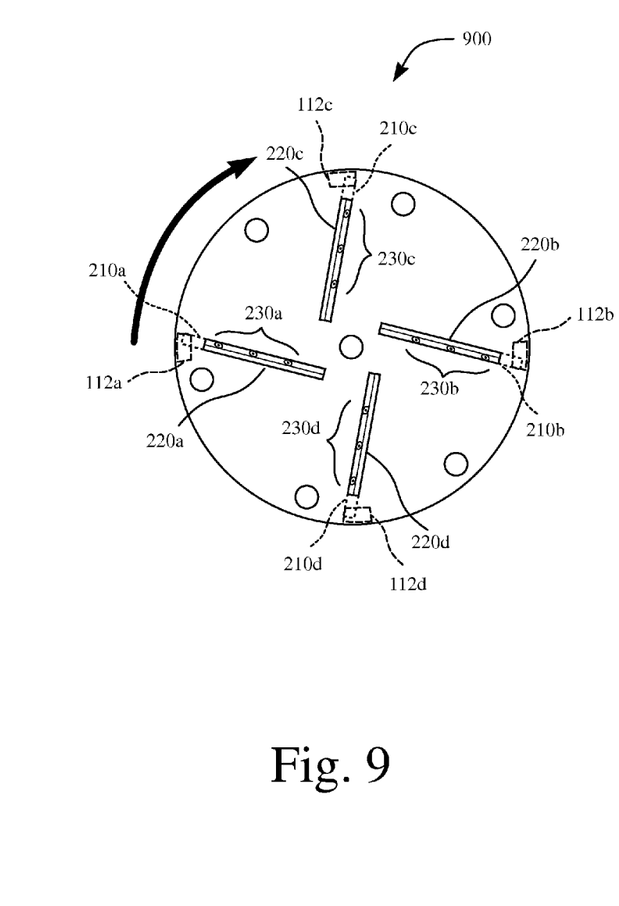
FIG. 9 is an illustration of an embodiment of an alternative rotor in a hybrid electric rotary engine.
Figure 10:
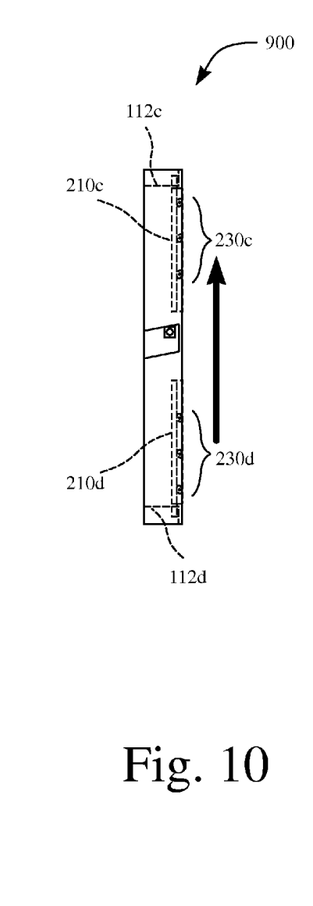
FIG. 10 is an edge view of the alternative rotor of FIG. 9.

FIG. 9 is an illustration of an embodiment of an alternative rotor 900 in a hybrid electric rotary engine 100 and FIG. 10 is an edge view of the alternative rotor 900. The outer face of the alternative rotor 900 is illustrated. The alternative rotor 900 includes two pair of rotor openings 112*a*, 112*b*, 112*c*, 112*d*. The rotor openings 112*a*, 112*b* function as illustrated in FIG. 3 above and the rotor openings 112*c*, 112*d* are shifted by 90° so that each is respectively spaced between the rotor openings 112*a*, 112*b*.

Likewise, there are two additional exhaust chambers 210*c*, 210*d* in addition to the previous exhaust chambers 210*a*, 210*b*. Each of the four exhaust chambers 210*a*, 210*b*, 210*c*, 210*d* also correspond to a respective inset 220*a*, 220*b*, 220*c*, 220*d* and their respective rocket nozzles 230*a*, 230*b*, 230*c*, 230*d*.

In operation, the alternative rotors 900 are used in pairs, as above, and can be used in engines 100 having a divider with one or more pairs of divider openings 122. In one embodiment, the divider 120 has two pair of divider openings 122 corresponding to the two pair of rotor openings 112*a*, 112*b*, 112*c*, 112*d* in the alternative rotor 900. In another embodiment, the divider 120 may have only one pair of divider openings 122 so that each alternative rotor opening 112*a*, 112*b*, 112*c*, 112*d* aligns only twice per rotation. Other arrangements will become apparent to those of skill in the art.

From the foregoing description, it will be recognized by those skilled in the art that a hybrid electric rotary engine 100 having a pair of rotors 110*a*, 110*b* separated by a divider 120 and configured for rotation in opposite directions, a timing gear 132 engaged between the inner faces 401 of the rotors 110*a*, 110*b*, and at least one pair of slanted rotor openings 112 in the rim 114*a*, 114*b* (collectively 114) of each rotor 110*a*, 110*b* for alignment with at least one pair of slanted divider openings 122 to form a pair of combustion chambers in communication with at least one pair of exhaust chambers 210 for venting of exhaust and to provide rotational thrust has been provided.

While the present disclosure has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The disclosure in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A hybrid electric rotary engine comprising:
   a pair of rotors separated by a divider, each of the pair of the rotors comprising:
   an inner face adjacent to the divider;
   an outer face;
   an axle hole; and
   a rim, the rim adjoining the outer face to the inner face at an outer edge;
   wherein, said each rotor of the pair of the rotors is configured for a direction of rotation around an axle and opposite to one another;
   a timing gear engaged between the inner face of the first rotor and the inner face of the second rotor;
   at least one pair of slanted rotor openings, where each of the slanted rotor openings is in the rim of each of the respective rotor and opposite each of the other slanted rotor opening, the at least one pair of the slanted rotor openings corresponding to at least one pair of the slanted divider openings within the divider, said each of the slanted rotor openings configured to align with at least one of the slanted divider openings per rotor revolution, the alignment of at least one of the pair of the slanted rotor openings with the corresponding pair of the slanted divider openings forming a combustion chamber;
   at least one pair of exhaust chambers within said each of the pair of the rotors, said each of the at least one pair of the exhaust chambers is in communication with one of the slanted rotor openings, said each of the at least one pair of the exhaust chambers extending from the corresponding one of the slanted rotor opening toward the axle and providing for venting of exhaust through an inset in the outer face of the respective rotor to provide additional thrust;
   whereby fuel and air, or a mixture thereof, is injected into said each of the combustion chambers during alignment, and whereby an ignition of the fuel and air, or a mixture thereof, in said each of the combustion chambers, aids to provide rotational thrust to said each of the pair of the rotors and to be exhausted through said at least one pair of the exhaust chamber, respectively.

2. The hybrid electric rotary engine of claim 1, wherein the pair of the rotors are identical in diameter and weight.

3. The hybrid electric rotary engine of claim 1, said each of the slanted rotor openings of the at least one pair of the slanted rotor openings situated opposite each other in the rim of the respective rotor, said each of the slanted rotor openings comprising a cavity extending from the rim toward the axle hole, and also including an opening on the inner face and extending at an angle from the inner face toward the outer face of the respective rotor and in the direction of rotation.

4. The hybrid electric rotary engine of claim 1, wherein the timing gear is a pinion to engage said each of the rotors.

5. The hybrid electric rotary engine of claim 4, said each of the rotors further comprising a crown type gear on the inner face of the respective rotor, the crown type gear including teeth to engage the pinion.

6. The hybrid electric rotary engine of claim 4, the timing gear further configured for driving at least one of the following:
   an oil pump,
   a water pump,
   a supercharger.

7. The hybrid electric rotary engine of claim 1, wherein said each of the at least one pair of the slanted rotor openings aligns with the at least one pair of the slanted divider openings per rotor revolution.

8. The hybrid electric rotary engine of claim 1, said each of the exhaust chambers further comprising a plurality of rocket nozzles, the plurality of the rocket nozzles in communication with the corresponding inset for venting exhaust.

9. The hybrid electric rotary engine of claim 1, said each of the rotors further comprising a plurality of magnets in the outer face, the magnets located for communication with a plurality of coils adjacent each of the rotors.

10. The hybrid electric rotary engine of claim 1, further comprising a casing in which the pair of the rotors and the divider are enclosed, the casing further comprising:
   an opening dimensioned for the timing gear;
   a plurality of air bearing injection holes within each side of the casing and situated near the rim of said each of the rotors; and a plurality of coils on each side of the casing, the plurality of the coils situated around the periphery of the casing and located to communicate with the rotor magnets.

11. A hybrid electric rotary engine comprising:
a pair of rotors separated by a divider, each of the pair of the rotors further comprising:
  an inner face adjacent to the divider;
  an outer face;
  an axle hole; and
  a rim, the rim adjoining the outer face to the inner face at an outer edge;
wherein, said each rotor of the pair of the rotors is configured for a direction of rotation around an axle and opposite to one another;
a timing gear engaged between the inner face of the first rotor and the inner face of the second rotor;
at least one pair of rotor openings, where each of the rotor openings is in the rim of each of the respective rotor and opposite each of the other rotor opening, said each of the rotor openings is situated opposite each other in the rim of the respective rotor, said each of the rotor openings comprising a cavity extending from the rim toward the axle hole, and also including an opening on the inner face and extending from the inner face toward the outer face of the respective rotor;
at least one pair of divider openings within the divider, said each of the divider openings located for alignment with one of the rotor openings per rotor revolution, the alignment of said each pair of the divider openings with the corresponding rotor openings forming a combustion chamber;
at least one pair of exhaust chambers, where said each of the exhaust chambers is within the respective rotor, said each of the exhaust chambers in communication with one of the rotor openings, said each of the exhaust chambers extending from the corresponding rotor opening toward the axle and providing for venting of exhaust through the outer face of the respective rotor to provide additional thrust;
whereby fuel and air, or a mixture thereof, is injected into said each of the combustion chambers during alignment, and whereby an ignition of the fuel and air, or a mixture thereof, in said each of the combustion chambers, aids to provide rotational thrust to said each of the pair of the rotors and to be exhausted through said at least one pair of the exhaust chamber, respectively.

12. The hybrid electric rotary engine of claim 11, wherein the pair of the rotors are identical in diameter and weight.

13. The hybrid electric rotary engine of claim 11, said each of the rotor openings of each of the at least one pair of the rotor openings is a slanted rotor opening extending from the inner face toward the outer face of the respective rotor and in the direction of rotation.

14. The hybrid electric rotary engine of claim 11, said each of the rotors further comprising a gear on the inner face of the respective rotor.

15. The hybrid electric rotary engine of claim 14, the timing gear further comprising splines for engaging said each of the rotors.

16. The hybrid electric rotary engine of claim 14, the timing gear further configured for driving at least one of the following:
  an oil pump,
  a water pump,
  a supercharger.

17. The hybrid electric rotary engine of claim 11, wherein said each of the at least one pair of the rotor openings aligns with at least one of the pair of the divider openings per rotor revolution.

18. The hybrid electric rotary engine of claim 11, said each of the exhaust chambers further comprising a plurality of rocket nozzles, the plurality of the rocket nozzles are in communication with a corresponding inset in the outer face of the respective rotor for venting exhaust.

19. The hybrid electric rotary engine of claim 11, said each of the rotors further comprising a plurality of magnets in the outer face, the magnets located around a periphery of the outer face for communication with a plurality of coils adjacent said each of the rotors.

20. The hybrid electric rotary engine of claim 11, further comprising a casing in which the pair of the rotors and the divider are enclosed, the casing further comprising:
  an opening dimensioned for the timing gear;
  a plurality of air bearing injection holes on each side of the casing and situated near the rim of said each of the rotors; and
  a plurality of coils on each side of the casing, the plurality of the coils situated around the periphery of the casing and located to communicate with the rotor magnets.

* * * * *